Fig.1

Sept. 23, 1952     M. H. LONDON     2,611,535
SAFETY INTERLOCKED TICKET RECEIVING AND CHECKING MACHINE
Filed June 23, 1948     6 Sheets-Sheet 5

INVENTOR.
Milton H. London
BY
Daniel J. Cullen,
Attorney

Sept. 23, 1952 M. H. LONDON 2,611,535
SAFETY INTERLOCKED TICKET RECEIVING AND CHECKING MACHINE
Filed June 23, 1948 6 Sheets-Sheet 6

INVENTOR.
Milton H. London
BY Daniel G. Cullen
Attorney

Patented Sept. 23, 1952

2,611,535

UNITED STATES PATENT OFFICE 2,611,535

SAFETY INTERLOCKED TICKET RECEIVING AND CHECKING MACHINE

Milton H. London, Detroit, Mich.

Application June 23, 1948, Serial No. 34,738

9 Claims. (Cl. 232—12)

This application relates to ticket receiving machines and more particularly to machines useful in motion picture theaters and the like for receiving admission tickets. The machine may be operated to receive tickets and to stack and count received tickets or severed halves of tickets.

A principal object of the invention is to provide a ticket receiving machine having certain novel characteristics and features, for an understanding of which reference should be had to the following detailed description and to the accompanying drawings.

Figure 1:
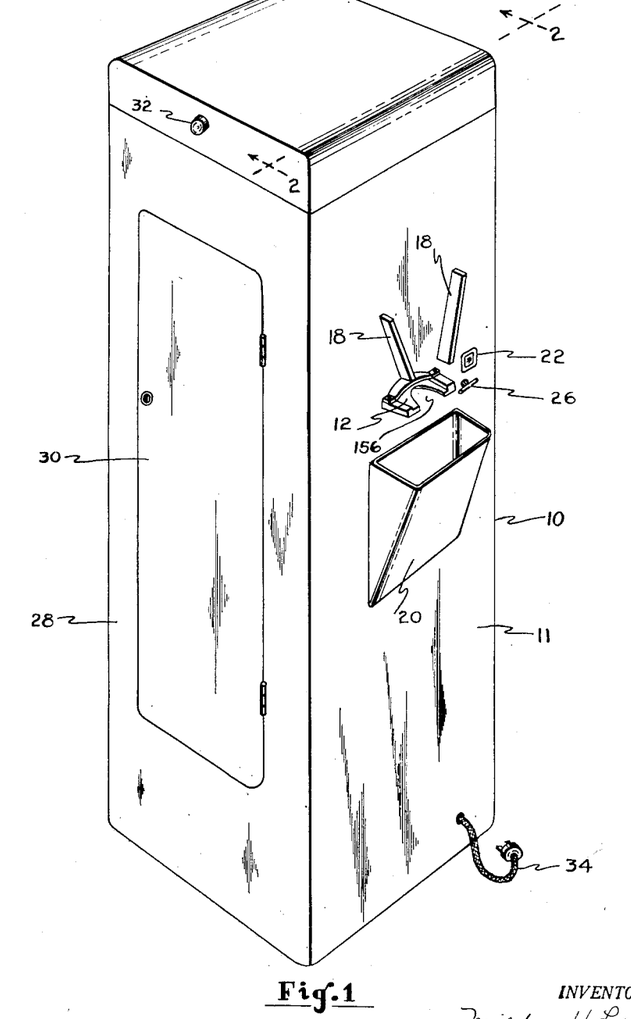
Fig. 1 is an outside view of the machine.
Figure 14:
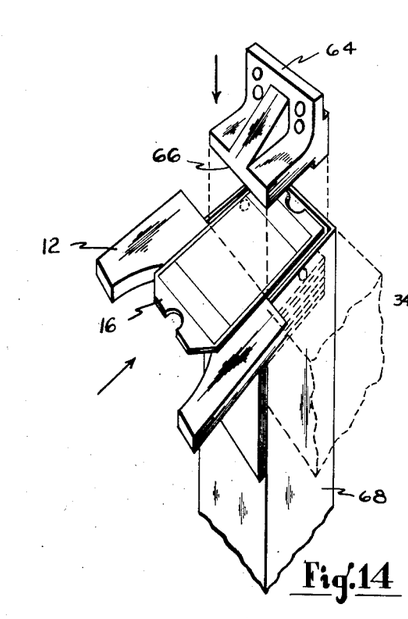
Fig. 14 is an exploded view of a ticket receiving slot or guide, a knife and a ram, and a tube for receiving severed halves of tickets.

Referring to the drawings, and particularly Fig. 1, it will be observed that the machine 10 has projecting thru its right side wall 11 a ticket receiving guide or mouth piece 12 aligned with a slot 14 (Fig. 3) of the casing of the machine, into which guide a ticket 16 may be inserted, as shown in Fig. 14. Bars 18 on wall 11 are provided for centering a ticket towards the ticket guide 12. Below the guide 12 is a stub receptacle 20 into which the theater usher who is operating the machine drops ticket halves not accepted by patrons, it being understood that inserted tickets are severed so that half tickets are left in the hands of the usher who then returns them to the patrons, or, if the latter refuse the ticket halves, the usher drops them into the receptacle 20. The severed halves within the machine are stacked and collected and counted in a manner and for a purpose that will later be described.

Figure 15:
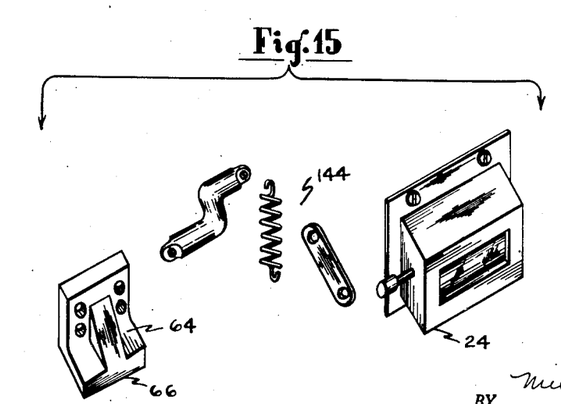
Fig. 15 is an exploded view showing the connecting means between the ram and a counter.
Figure 16:
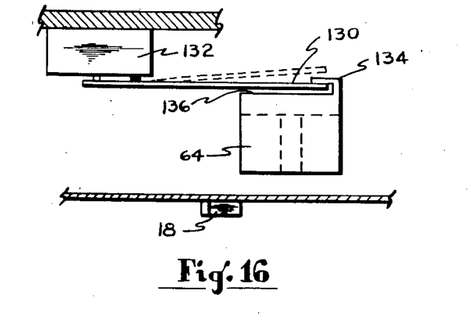
Fig. 16 is a partial section view on line 16—16 of Fig. 3.

Adjacent the guide 12 is a window 22 exposing a counter 24, Fig. 15, and near the window 22 is an operating handle 26 which forms the main control handle for the machine.

On the back wall 28 of the box 10 is a hinged and locked door 30 giving access to the interior of the casing and above which is a signal light or button 32.

Electric current for operating the machine may be obtained from a suitable supply line to which connection may be established by the cord and cap 34.

Within the box or casing is the machine proper. The latter includes four corner posts 36, Fig. 2, which together with cross members 38, 40, 42, 44 and 46 form the frame of the machine. Guide 12 is mounted on and above cross piece 42 to project thru slot 14 of wall 11. Counter 24 is mounted on a support block on cross member 40.

Figure 4:
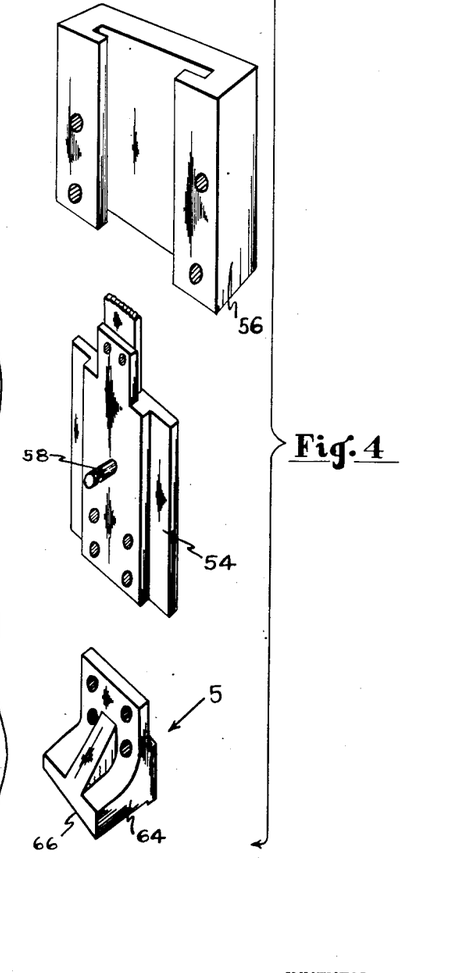
Fig. 4 is an exploded view of a ticket severing and a severed half moving means, somewhat as if in the direction of the arrow 4 of Fig. 3.

The upper cross member 38 mounts a solenoid 50 in which vertically moves a plunger 52 connected at its lower end to a slide 54, Fig. 4, formed to slide in ways of a guide 56 mounted on the cross member 40. To a pin 58 on slide 54 and to a pin 60 on the frame of a solenoid 50 are connected the ends of a coil spring 62 which returns the slide 54 to its upper most position after the slide has been moved downward by the energization of the solenoid 50 and downward movement of the plunger 52 and slide 54. Fastened to the lower end of slide 54 is a knife and ram unit 64 whose edge 66 is a knife-edge and whose lower surface is adapted to push ticket halves severed by the knife-edge 66 downwardly into a ticket receiver or tube 68 positioned immediately below the ram 64 and having its upper end normally open when in place for receiving severed ticket halves.

Figure 9:
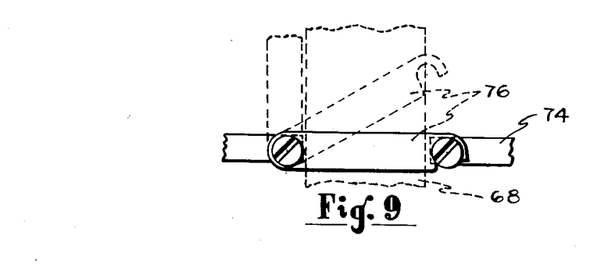
Fig. 9 is a fragmentary view as if in the direction of the arrow 9 of Fig. 3.

The tube 68 is of square cross section closely corresponding to the shape of the severed ticket halves and is of considerable length, and is seated in cut-outs 72 of horizontal flanges 74 of the cross members 42—44, being held therein by the swinging lock bars 76, Fig. 9.

Figure 3:
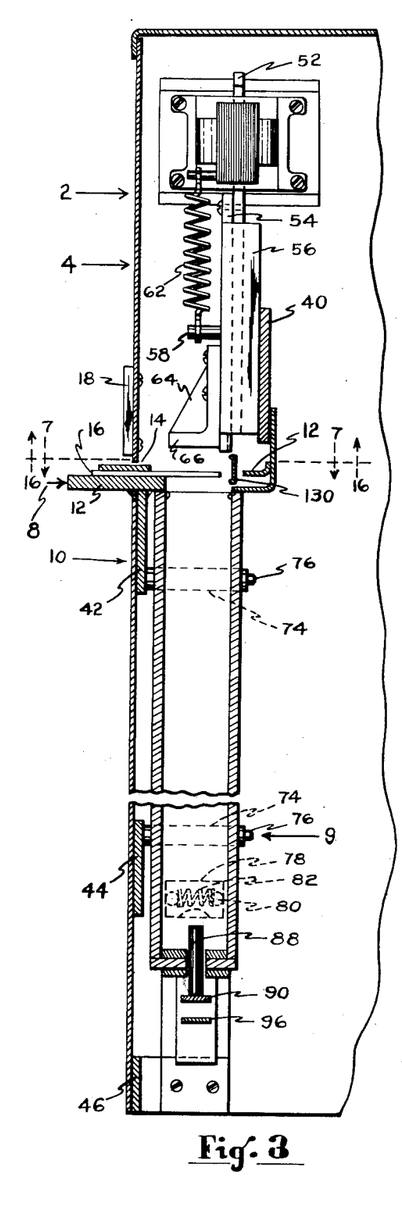
Fig. 3 is a transverse section of the machine as a whole, somewhat as if on line 3—3 of Fig. 2, but with the casing shown.

Within the tube 68 is a sliding bottom or follower block 78 (Fig. 10) having ball checks or detents 80 biased outwardly by a spring 82 and adapted to be moved down by the stack of ticket halves pushed down into the tube by the ram 64 (Fig. 3). Lugs 83 at the top of the tube 68 (Fig. 10) prevent outward movement of block 78 and restrain but do not totally prevent outward movement of ticket halves from tube 68.

Figure 2:
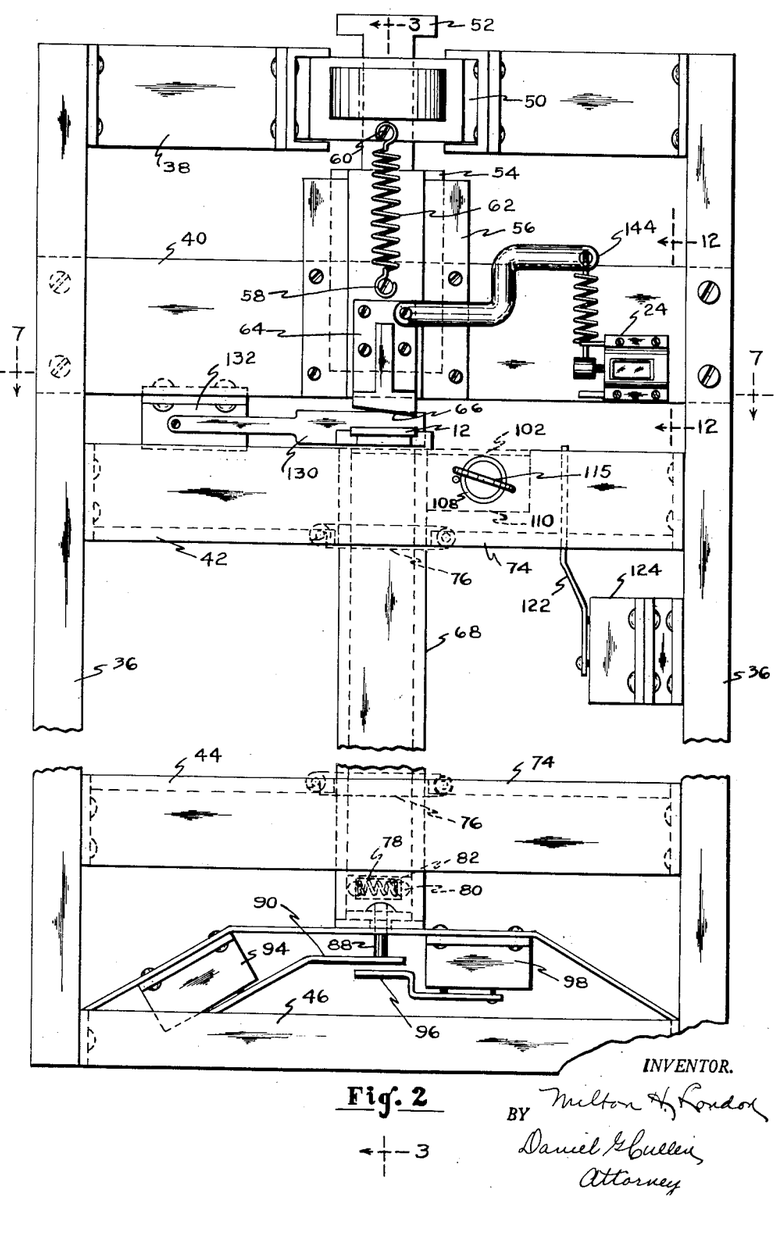
Fig. 2 is a section as if on line 2—2 of Fig. 1, showing the interior of the machine, as if the casing were removed.
Figure 10:
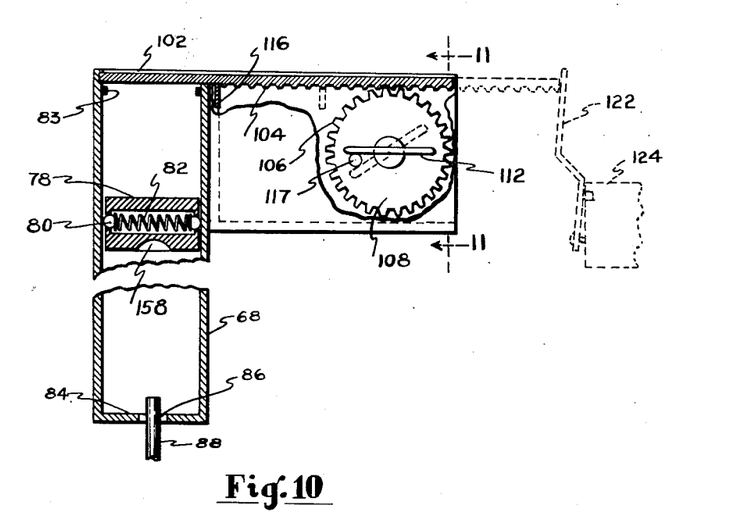
Fig. 10 is a fragmentary section view as if in the direction of the arrow 10 of Fig. 3.
Figure 11:
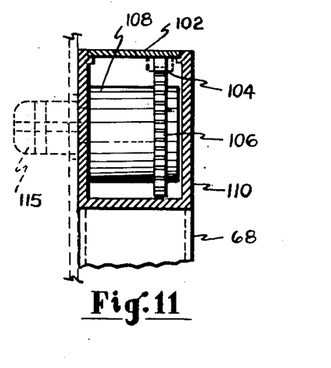
Fig. 11 is a view as if on line 11—11 of Fig. 10.
Figure 12:
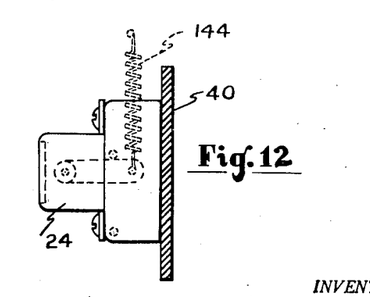
Fig. 12 is a section view as if on line 12—12 of Fig. 2.
Figure 13:
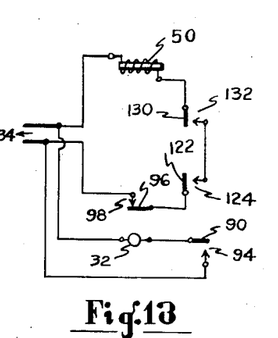
Fig. 13 is a wiring diagram.

The lower end 84 of the tube 68, as shown in Fig. 10, is normally closed but has an opening 86 for receiving a plunger 88 fastened to and projecting upwardly from a switch arm 90, Fig. 2, of a normally open switch 94 connected in circuit with signal lamp 32, as shown in Fig. 13, whereby downward movement of the follower block 78 to the point where it engages the plunger 88 will close switch 94, by moving arm 90 downwardly and thus close the circuit to the signal lamp 32, to indicate to the user of the machine that the tube 68 is almost completely full of ticket halves, as indicated by the fact that the follower block 78 has moved down to a point near the lower end 84 of the tube 68.

Below switch arm 90 controlling the signal light 32, Fig. 2, is a second switch arm 96 for operating a normally closed switch 98 which is one of three series switches for the circuit for the solenoid 50, as shown in Fig. 13, whereby switch 98 will be opened to deenergize the solenoid 50 when the follower block 78 in tube 68 has reached its lower-most position to engage plunger 88 and move it to the point where it causes opening movement of arm 96 of switch 98, thus indicating that the follower block is in its lower-most position, and rendering the solenoid 50 inoperative. This is in response to the fact that the tube 68 is loaded to maximum capacity with severed ticket halves pushed down into the tube at its upper end by the ram 64 slidably connected to the solenoid plunger 52 and having thereon the knife edge 66 for severing the tickets inserted into the ticket guide 12 of Fig. 1.

The upper end of the tube 68 is normally open during the use of the machine. However, it is provided with a slidable closure plate 102 on whose lower surface are formed rack teeth 104 for engagement with the teeth 106 of a gear formed around a lock barrel 108 rotatably mounted in an enlarged portion 110 of the tube 68 and positioned to one side of the main portion of such tube.

Figure 7:
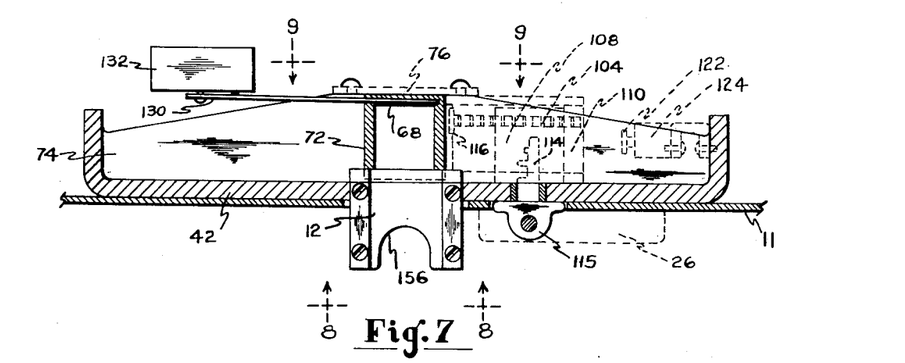
Fig. 7 is a transverse section view as if on line 7—7 of Fig. 3.

The lock barrel 108 has a key receiving slot 112 for receiving a key 114, Fig. 7, journalled but non-removably mounted in the cross member 42, and having its head 115 formed to project thru an opening of the casing wall 11, so that it may be provided with a handle which serves as the operating handle 26, Fig. 1, of the machine. Rotation of the key 114 by its handle 26 causes rotation of the lock barrel 108 in turn to cause sliding movement of the tube closure 102, the latter having a stop 116 for limiting its lateral travel. Stop 117 on tube enlargement 110 limits rotation of lock barrel 108.

When the closure is in its closed position, as shown in full lines in Fig. 10, the lock barrel slot 112 is in registry with the key 114 to permit the tube 68 to be mounted on and placed in the cross members 42 and 44 of the machine, with the lock barrel 108 receiving the key 114, and this insures against mounting the tube 68 except when its closure 102 is in tube closing position. Likewise, because the key 114 and its lock barrel 108 are formed to be non-separable except when the lock barrel is in the full line position shown in Fig. 10, removal of the tube 68 from the machine is not permitted except when the closure 102 is in tube closing or blocking position.

However, after the tube 68 has been mounted in the machine with its closure 102 in tube closing position, that is with lock barrel 108 receiving key 114, the exposed handle 26 of the latter may be rotated clockwise, Fig. 10, to cause closure 102 to move to the dotted line or open position, Fig. 10, to open the tube 68 and also to engage a switch arm 122 of a normally open switch 124, for closing the latter and thus closing the circuit for solenoid 50, Fig. 13, at a second of the three points of opening of that circuit, as indicated in Fig. 13. Thus it will be seen that the solenoid circuit is not closed when there is no authorized tube 68 properly mounted in a machine and opened for receiving severed ticket halves.

Disposed in line with ticket guide 12, Fig. 3, so as to be engaged by the leading end of a ticket 16 inserted into the machine through that guide is a fourth switch arm 130 for controlling a normally open switch 132, Fig. 2, which is the third of the three switches in series with the solenoid 50 in the solenoid circuit, as shown in Fig. 13.

When the first of the three switches 96 is closed, as it normally is, and when the second of the three switches 124 is closed, as by the insertion of a tube 68 in the machine and the movement of tube closure 102 to tube open position, Fig. 10, then the closing of the third switch 132 by the engagement of the ticket end with the switch arm 130 will energize the circuit for solenoid 50 and cause downward movement rapidly and suddenly of the armature 52, the slide 54 and the ram 64 with its cutting edge 66, whereby the ticket 16 that caused the closing of switch 132 will be severed by the knife edge 66 and where upon continued downward movement of the plunger 52 and slide 54 and ram 64 will push the severed ticket half down into the tube 68 through its open upper end. Shortly but not immediately thereafter, the switch 132 will open because the closing force on its arm 130 obtained by the pressure of the ticket on that arm 130 will no longer exist, because of the severing of the ticket, and the solenoid circuit will be open at switch 132 to deenergize the solenoid 50, whereupon spring 62 will return the plunger 52, slide 54 and ram 64 to the uppermost position ready for repeated operations upon repeated insertion of tickets 16 into the receiver 12.

The speed of ram 64 on advance is greater than the gravity speed of a severed ticket's fluttering down to the tube and hence ram 64 holds the ticket until the latter is added to the stack in the tube. This accurately positions the ticket with respect to the stack and the closely dimensioned tube, since the ram pushes the ticket down into the tube.

Figure 5:
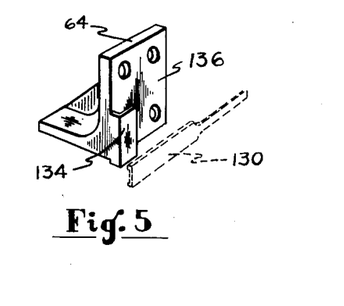
Fig. 5 is a rear view of a ticket moving ram at the lower part of Fig. 4 somewhat as if in the direction of the arrow 5 of Fig. 4.

Inasmuch as it is necessary for the solenoid circuit switch 132 to remain closed for a moment after the ticket has been severed by the knife edge 66, in order that the ram 64 move downwardly and push the severed ticket half down into the tube 68, a cam 134, Fig. 5, is provided on the ram 64 to maintain the arm 130 in position to close switch 132 during full downward travel of the ram 64 past the point where knife edge 66 has severed the ticket. When the upper edge of cam 134 travels past arm 130, however, it no longer maintains arm 130 in position to close switch 132 and that arm will return, due to its resiliency, to switch open position to deenergize the solenoid circuit. The ram 64 will move upwardly, with arm 130 now occupying a position between the cam 134 and the back plate 136 of the ram 64 during the upward stroke of that ram.

Figure 6:
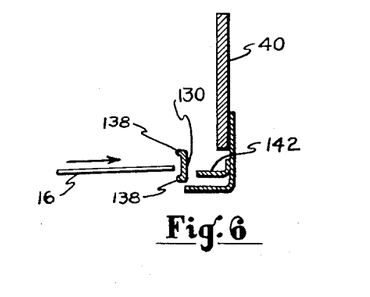
Fig. 6 is an enlarged view in section showing a switch arm adapted to be moved for switch closing by the insertion of a ticket.

Fig. 6 illustrates the construction of the arm 130. It is somewhat grooved or channel shaped to have lips or edges 138 to insure the ticket end remaining in engagement with the arm 130 and not deflecting and sliding off that arm without causing ticket severance.

Fig. 6 also illustrates a stop 142 for limiting closing movement of the arm 130 and preventing excessive bending of that arm and injury to it and to its switch 132 by insertion into the ticket receiver of foreign objects or unauthorized tickets.

The back stop 142 of Fig. 6 also operates to prevent insertion of tickets beyond the halfway mark, assuming that authorized tickets are being inserted, and thus prevents severed halves of greater than proper size to be cut off and to be pushed down into the tube 68 which is dimensioned to fit rather closely the ticket halves of authorized and proper size.

Fig. 15 illustrates a mechanical connection between ram 64 and counter 24 mounted on cross member 40, established through the links and springs indicated generally at 144 whereby each downward stroke of the ram 64 and thus each ticket severance is recorded on the counter 24 whose totals may be read through the window 22 of Fig. 1.

Figure 8:
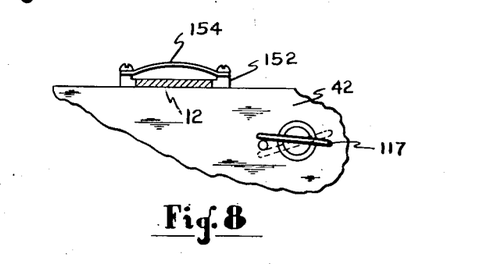
Fig. 8 is a view as if in the direction of the arrow 8 of Fig. 3 and as if in section on line 8—8 of Fig. 7.

Fig. 8 illustrates the details of construction of the ticket guide referenced generally at 12 in Fig. 1. The guide includes a base plate 152 mounted on cross member 42 and projecting through an opening 14 in the casing or box wall 11. The base plate is formed with ways or guides 152 whereby a ticket may be inserted and guided conveniently under an arched retainer 154 for the tickets, and the base plate 152 is formed with a finger notch 156 whereby the operator may conveniently hold the ticket after he has inserted half of it into the machine for severance and for movement into the tube 68.

The tube 68 has at least one and preferably all of its sides of transparent material whereby a stack of tickets therein may be viewed for inspection without being removed from the tube, but being held therein by the closure plate 102 which must be in tube closing position when the tube is removed from the machine. However, when the tube is in the machine and closure plate 102 is in open position, a stack of tickets within the tube is held against accidental movement out of the upper or open end of the tube by decompression, by spring lugs 83 in the upper end of the tube.

A stack of tickets may be removed from a tube when the tube is out of the machine, first by opening the closure plate 102, as by possession and use of an authorized key for cooperation with the lock barrel 108, and secondly, by insertion of a stack removal rod into the tube through the plunger receiving opening 86 in the tube lower end 84, the leading end of such rod engaging a socket 158 of follower block 78 to push it upwardly in the tube and thus expel the stack of tickets from the tube through its upper end. Spring lugs 83 do not prevent such removal of the stack from the tube, since they are weak enough to be overcome by the manual pushing force on the stack removal rod.

*The use of the machine*

When the machine is to be used it is connected to a supply line for electricity by the plugging in of the cord cap 34, Fig. 1. The door 30 is opened and if there is no tube 68 in place in the machine then a tube 68, which at that time has its upper end closed and locked, is mounted in the machine and clamped therein by the swing clamps 76 and with the lower end of the tube receiving the plunger 88 for controlling switches 94 and 98. Switch 94 is normally open and thus is open at that time, so that signal light 32 is not energized. Switch 96 is normally closed and remains closed at this time. If the tube 68 is an authorized tube and is properly located and adjusted, slot 112 of its lock barrel 108 will receive key 114 which then can be rotated by handle 26 to open the tube by sliding cover plate 102 to the right, Fig. 10, and at the same time to close the normally open switch 124.

The parts are still not electrically energized, but when a ticket 16 is inserted into the guide 12 so that its leading end engages switch arm 130 to close switch 132, solenoid 50 will be energized to cause the ram 64 to move downwardly, first to sever the ticket, leaving a stub in the fingers of the operator who may then return it to the patron or drop the stub into the receptacle 20 of Fig. 1, and then to push the severed half within the machine down into the tube 68 past the lugs or ridges 83 which prevent tickets within the tube from moving outwardly and upwardly by decompression. When the ram 64 completes its downward stroke, it relieves the pressure on switch arm 130 and permits that arm to move to the position where it opens switch 132, thus deenergizing the solenoid and permitting the ram to be moved upwardly by the ram return spring 62, and the machine is again deenergized until another ticket is inserted.

When enough tickets have been inserted into the machine so that the severed ticket halves form a stack of required length in the tube 68, follower block 78 will be moved downwardly to engage plunger 88 and cause switch 94 which is normally open to close and energize the warning signal lamp 32 to indicate that the tube is almost full and should be removed and replaced by an empty tube.

In the event this is not done and more ticket halves are thrust down into the tube sufficient to move the follower block 78 further down into the tube, arm 96 will be moved downwardly to open switch 98 and render the solenoid circuit inoperative so that further ticket insertions will not cause ticket severance, with possible injury to the tube because of overcrowding and ram action on a compressed stack of tickets excessive in number or thickness and stack height.

When a tube is to be removed, it is necessary first to rotate handle 26 to permit lock barrel 108 to slide off the key 114 and this can occur only when accompanied by closing movement of the tube closure 102 and by opening of the switch 124 by the relieving of the pressure on arm 122 from tube closure 102. With the tube closed and its closure locked, the tube can be removed from the machine and replaced by an empty tube.

When a full tube is to be emptied, it is necessary to unlock and open it by the use of an authorized key fitting the lock barrel 108, after which a rod may be inserted into the tube through opening 86 to push the follower block 78 towards the open upper end of the tube and to expel the stack of tickets from the tube.

The warning signal light 32 is energized only when the tube is in place and almost completely full of ticket halves.

The counter counts only severances and movements of tickets to the receiver 68 and does not count ticket insertions, and only when the various conditions of normal operation are properly satisfied (tube insertion-tube opening-ticket insertion, ticket severance, and movement), will the counter operate to count.

Some important features

It may be noted that numerous inter-locks for operation of the machine have been provided, with the following results. Every inserted ticket is severed to comply with legal requirements to this effect. Every ticket severance is counted but only severances are counted. Every ticket severance results in a half ticket being pushed down into the tube. The tube cannot be inserted or removed unless its closure is locked in tube closing position. The machine is inoperative except when an authorized tube is in place and is properly opened. Tickets cannot be removed from the tube except by opening the tube cover or closure with an authorized key.

It will be observed that the ticket halves are not destroyed but are collected in a neat and easily viewable and identifiable stack in a locked container or tube; the tickets are available for counting and examination to detect mischief and theft, with each ticket severance being counted so as to enable checking the number of ticket destructions reported by the counter with the number and type of ticket halves stacked in the tube, and with the number of tickets reported as sold, to detect the use of spurious and out-of-order tickets.

The provision of key 114 on the casing and lock 108 for the tube closure, and key lock for door 30, are effective to prevent the use of unauthorized tubes, to prevent unauthorized removal of a tube or a stack of tickets from the receiver, unauthorized opening of a tube, and unauthorized collection or destruction of ticket halves.

It may also be noted that the ticket severing means cannot be operated when the tube is full of severed halves, due to the opening of switch 98, or when the tube is not open to receive ticket halves, whereby injury to parts is inhibited.

Likewise operation of the knife and ram except when a tube is in place to receive ticket halves is also inhibited.

It will also be observed that the tube may neither be inserted into nor removed from the machine except when it is locked closed by cooperation by the authorized key permanently and non-removably mounted in the machine. Locking the tube in the machine under the severing means, simultaneously sets up the circuit for the severing means or solenoid 50 so as to be operable by insertion of a ticket.

The single lock provided by the key 114 and the barrel 108 simultaneously locks the tube in the casing under the knife 66, opens the tube, and closes the switch which controls the circuit for the solenoid 50. Similarly, simultaneous operation of the lock in the reverse direction will deactivate the circuit for the solenoid 50, will release the tube from the machine, and will lock the tube so as to prevent the ticket halves from being removed from the tube.

It will also be observed that the tube may be mounted in position only when its lock barrel is movable onto the key 114. This can occur only when the tube is closed and locked. Likewise, the cooperation of the key and the lock barrel insure that the tube may be removed from the machine only when it is closed and locked.

It will also be observed that the cam 134 on the ram insures the solenoid circuit remaining closed for continued ram operation, even after the ticket has been severed. It will also be observed that the provision of switch 98 insures against ticket severance when there is a stack of greater height in the tube than is proper and desired, the length of the stack determining the opening of the solenoid circuit at the switch 98 to render the solenoid inactive and the ticket severing knife 66 inoperative for severing.

Now having described the ticket receiving machine herein disclosed, reference should be had to the claims which follow for a determination of the inventions hereof.

I claim:

1. In a ticket collecting and stacking machine comprising a casing having a ticket receiving opening, means inside the casing for receiving tickets inserted through said opening in superimposed relation and arranged to form of them a vertical stack, means within the casing for moving inserted tickets to and into cooperative stacking relation with the receiver and thus to form in the receiver a vertical stack of superimposed tickets and releasable means for blocking the receiver and thus locking the stack to the receiver, thus to prevent unauthorized removal of a stack from the receiver, said blocking means being a part of and unitary with the receiver so as to be removable from and insertable into the casing only as part of the receiver as a whole, and releasable key means movably mounted in the casing and externally accessible for actuation and associated with the blocking means and operable for simultaneously locking a properly mounted and authorized receiver in place under the ticket moving means and for moving the blocking means from receiver blocking position and also operable for simultaneously releasing the receiver for removal thereof from the casing and moving the blocking means to receiver blocking position.

2. In a ticket collecting and stacking machine comprising a casing having a ticket receiving opening, means inside the casing for receiving tickets inserted through said opening in superimposed relation and arranged to form of them a vertical stack, means within the casing for moving inserted tickets to and into cooperative stacking relation with the receiver and thus to form in the receiver a vertical stack of superimposed tickets and releasable means for blocking the receiver and thus locking the stack to the receiver, thus to prevent unauthorized removal of a stack from the receiver, and releasable means for mounting and locking a properly mounted and authorized receiver in place under the ticket moving means, and interlocking means preventing the release of the means for mounting and locking the receiver in place unless accompanied by the blocking of the receiver and thus the locking of the stack to the receiver, and interlocking means for preventing the release of the receiver blocking means unless preceded by the proper mounting and locking in place of the authorized receiver in the casing, and interlocking means for preventing ticket moving operation of the ticket moving means unless preceded by the proper mounting and locking in place of an authorized receiver, and the release of the blocking means of such receiver.

3. In a ticket collecting and stacking machine comprising a casing having a ticket receiving opening, means inside the casing for receiving tickets inserted through said opening in superimposed relation and arranged to form of them a vertical stack, means within the casing for moving inserted tickets to and into cooperative stacking relation with the receiver and thus to form in the receiver a vertical stack of superimposed tickets, releasable means for blocking the receiver and thus locking the stack to the receiver, thus to prevent unauthorized removal of a stack from the receiver and formed as part of and unitary with the receiver so as to be removable from and insertable into the casing only as part of the receiver as a whole, and releasable key means movably mounted in the casing and externally accessible for actuation and associated with the ticket moving means and the receiver blocking means and operable for simultaneously moving the blocking means from blocking position and for conditioning the ticket moving means for ticket moving, and also operable for moving the blocking means to blocking position and conditioning the ticket moving means out of or against ticket moving operation.

4. In a ticket collecting and stacking machine comprising a casing having a ticket receiving opening, means inside the casing for receiving tickets inserted through said opening in superimposed relation and arranged to form of them a vertical stack, means within the casing for moving inserted tickets to and into cooperative stacking relation with the receiver and thus to form in the receiver a vertical stack of superimposed tickets and key means movably mounted in the casing and externally accessible for actuation and associated with the receiver and ticket moving means and operable for simultaneously locking a properly mounted and authorized receiver in place under the ticket moving means and also conditioning the ticket moving means for ticket moving operation and also operable for simultaneously releasing the receiver for removal from the casing and conditioning the ticket moving means against or out of ticket moving operation.

5. In a ticket collecting and stacking machine comprising a casing having a ticket receiving opening, means inside the casing for receiving tickets inserted through said opening in superimposed relation and arranged to form of them a vertical stack, means within the casing for moving inserted tickets to and into cooperative stacking relation with the receiver and thus to form in the receiver a vertical stack of superimposed tickets, releasable means for blocking the receiver and thus locking the stack to the receiver thus to prevent unauthorized removal of a stack from the receiver and formed as part of and unitary with the receiver so as to be removable from and insertable into the casing only as part of the receiver as a whole, and releasable key means movably mounted in the casing and externally accessible for actuation and associated with the receiver and the ticket moving means and the receiver blocking means and operable for simultaneously locking a properly mounted and authorized receiver in place under the ticket moving means and for moving the blocking means from receiver blocking position and for conditioning the ticket moving means for ticket moving and also operable for simultaneously releasing the receiver for removal thereof from the casing and moving the blocking means to receiver blocking position and for conditioning the ticket moving means out of or against ticket moving operation.

6. In a ticket collecting and stacking machine comprising a casing having a ticket receiving opening, means inside the casing for receiving tickets inserted through said opening in superimposed relation and arranged to form of them a vertical stack, means within the casing for moving inserted tickets to and into cooperative stacking relation with the receiver and thus to form in the receiver a vertical stack of superimposed tickets, a follower vertically slidable lengthwise of said receiver for supporting a stack of tickets and for moving downwardly as the stack increases in length with an increase in the number of tickets, means for actuating the ticket moving means, and means for inhibiting actuation of the ticket moving means and positioned to be engaged by the follower when the latter is in its lowermost position and thus conditioned for deactivating the ticket moving means.

7. A receiver for a stack of superimposed tickets comprising an elongated tube having a cover on its upper end, a lock for said cover, a slidable bottom in said tube on top of which the tickets are stacked in the tube, and means to block or prevent the slidable bottom from moving out of the lower end of the tube, said means having an opening to permit a plunger projecting through said opening upwardly into the lower end of the tube to be engaged by the slidable bottom when the latter is moved down to the lower end of the tube by a stack of tickets, and a control switch operatively connected to said plunger and whose condition is altered by engagement of the plunger by the slidable bottom.

8. A receiver for a stack of superimposed tickets comprising an elongated tube having a cover on its upper end, a lock for said cover, the cover being a horizontally sliding cover, and the lock including a barrel on a horizontal axis beneath the cover and mounted in a bulge at one side of the tube, and means operatively connecting the barrel and cover, whereby barrel rotation on a horizontal axis will cause the cover to slide horizontally.

9. A receiver for a stack of superimposed tickets comprising an elongated tube having a cover on its upper end, a lock for said cover, and means at the upper end of the tube independent of said cover for inhibiting tickets thrust into the tube from accidentally moving out of the upper end of the tube due to decompression forces even when the cover is open, said means being constructed to permit a stack of the tickets to be pushed up and out of said receiver, past the means, by a force exerted against the lower end of the stack, superior to the decompression force insufficient to overcome said means.

MILTON H. LONDON.

REFERENCES CITED

The following references are of record in the file of this patent:

UNITED STATES PATENTS

| Number | Name | Date |
| --- | --- | --- |
| 776,995 | Gorin | Aug. 9, 1904 |
| 1,625,170 | Tanner | Apr. 19, 1927 |
| 1,963,263 | Demetrakopoulos | June 19, 1934 |
| 2,000,159 | Bolognino | May 7, 1935 |
| 2,071,123 | Hubermeyer | Feb. 16, 1937 |
| 2,072,318 | Staude | Mar. 2, 1937 |
| 2,144,564 | Portman-Dixon | Jan. 17, 1939 |
| 2,277,916 | Klemt | Mar. 31, 1942 |
| 2,345,291 | Rose | Mar. 28, 1944 |
| 2,452,022 | Weingart, et al. | Oct. 19, 1948 |
| 2,465,146 | Broussard | Mar. 22, 1949 |
| 2,511,431 | Dashkin | June 13, 1950 |

FOREIGN PATENTS

| Number | Country | Date |
| --- | --- | --- |
| 5,907 | Great Britain | May 13, 1885 |